(12) United States Patent
Inagaki et al.

(10) Patent No.: US 8,673,500 B2
(45) Date of Patent: Mar. 18, 2014

(54) ACTIVE MATERIAL FOR BATTERIES, NON-AQUEOUS ELECTROLYTE BATTERY, AND BATTERY PACK

(75) Inventors: Hiroki Inagaki, Kawasaki (JP); Yasuhiro Harada, Yokohama (JP); Keigo Hoshina, Yokohama (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/353,569

(22) Filed: Jan. 19, 2012

(65) Prior Publication Data

US 2012/0171550 A1 Jul. 5, 2012

Related U.S. Application Data

(63) Continuation of application No. PCT/JP2009/063106, filed on Jul. 22, 2009.

(51) Int. Cl.
*H01M 4/131* (2010.01)
*H01M 4/48* (2010.01)
*H01M 4/505* (2010.01)
*H01M 4/525* (2010.01)
*C01G 23/047* (2006.01)

(52) U.S. Cl.
USPC ... 429/231.5; 429/223; 429/224; 429/231.95; 423/598; 423/610; 252/182.1

(58) Field of Classification Search
USPC ............. 429/209–246; 423/598, 608–616; 252/182.1
See application file for complete search history.

(56) References Cited

U.S. PATENT DOCUMENTS

2007/0292760 A1* 12/2007 Patoux et al. ............. 429/223

FOREIGN PATENT DOCUMENTS

| JP | 2004-152579 | 5/2004 |
| JP | 2005-317508 | 11/2005 |
| JP | 2008-034368 | 2/2008 |
| JP | 2008-117625 | 5/2008 |
| JP | 2009-81049 | 4/2009 |
| JP | 2010-55855 | 3/2010 |
| JP | 2010-123401 | 6/2010 |
| JP | 5017493 | 6/2012 |
| WO | WO 2009/028530 A1 | 3/2009 |
| WO | WO 2009/028553 | 3/2009 |

OTHER PUBLICATIONS

International Search Report issued Oct. 27, 2009 in PCT/JP2009/063106 filed Jul. 22, 2009.

(Continued)

*Primary Examiner* — Raymond Alejandro
*Assistant Examiner* — Helen McDermott
(74) *Attorney, Agent, or Firm* — Oblon, Spivak, McClelland, Maier & Neustadt, L.L.P.

(57) ABSTRACT

According to one embodiment, an active material for batteries includes monoclinic β-type titanium composite oxide having a crystallite, wherein the monoclinic β-type titanium composite oxide has a first diameter of the crystallite calculated from a peak present at an angle 2θ of 48 to 49° and a second diameter of the crystallite calculated from a peak present at an angle 2θ of 24 to 26°, by the wide-angle X-ray diffraction method using an X-ray source CuKα ray, the first diameter of the crystallite is defined as X and the second diameter of the crystallite is defined as Y, X is larger than Y.

10 Claims, 6 Drawing Sheets

(56) References Cited

OTHER PUBLICATIONS

Robert Armstrong, et al.; "TiO$_2$-B nanowires as negative electrodes for rechargeable lithium batteries"; Journal of Power Sources, 2005, vol. 146, pp. 501-506.

Office Action issued Mar. 6, 2012, in Japanese Patent Application No. 2011-523510 (with English-language translation).

U.S. Appl. No. 13/537,890, filed Jun. 29, 2012, Harada, et al.

Japanese Office Action mailed Jan. 7, 2014 in patent application No. 2012-093340 w/English translation.

Minoru Inaba et al., "TiO$_2$(B) as a promising high potential negative electrode for large-size lithium-ion batteries", Journal of Power Sources, Apr. 1, 2009, vol. 189/No. 1, pp. 580-584.

* cited by examiner

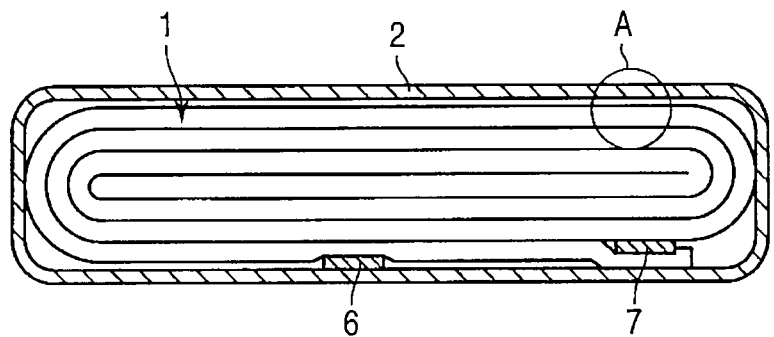
F I G. 1
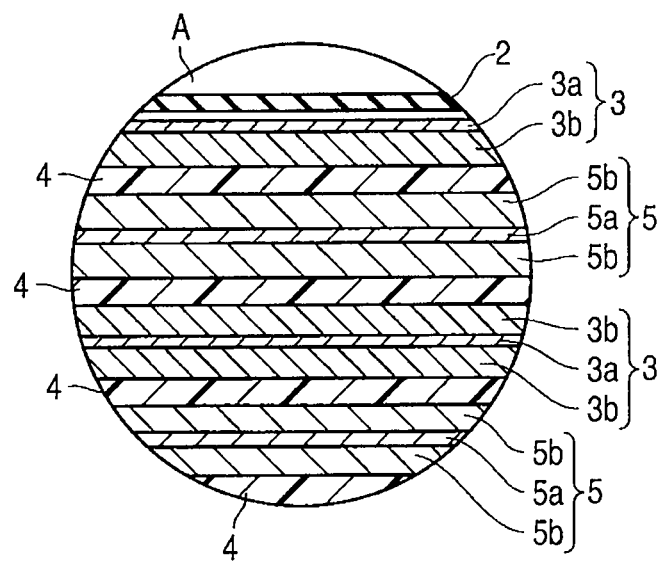
F I G. 2

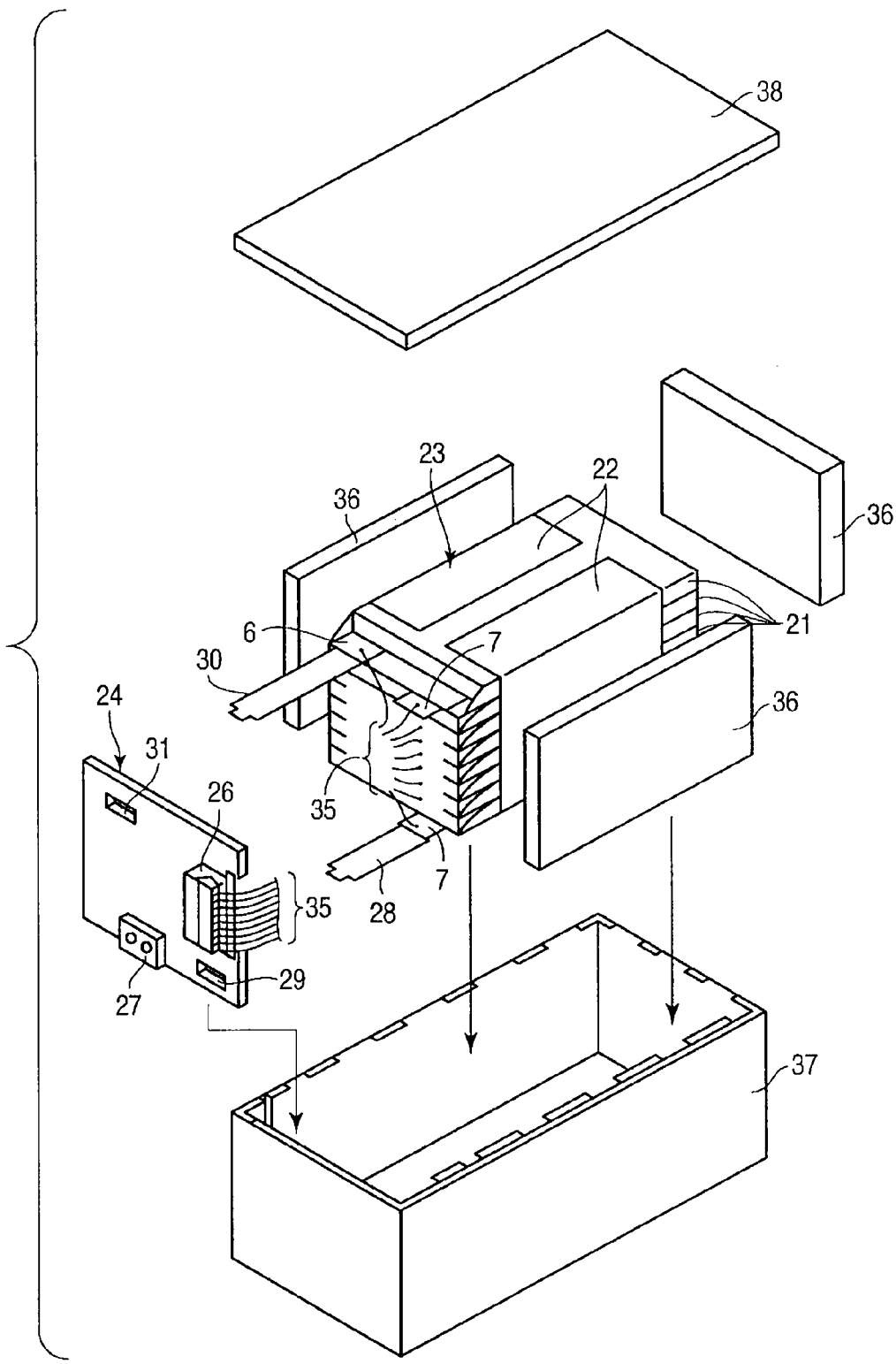
F I G. 3

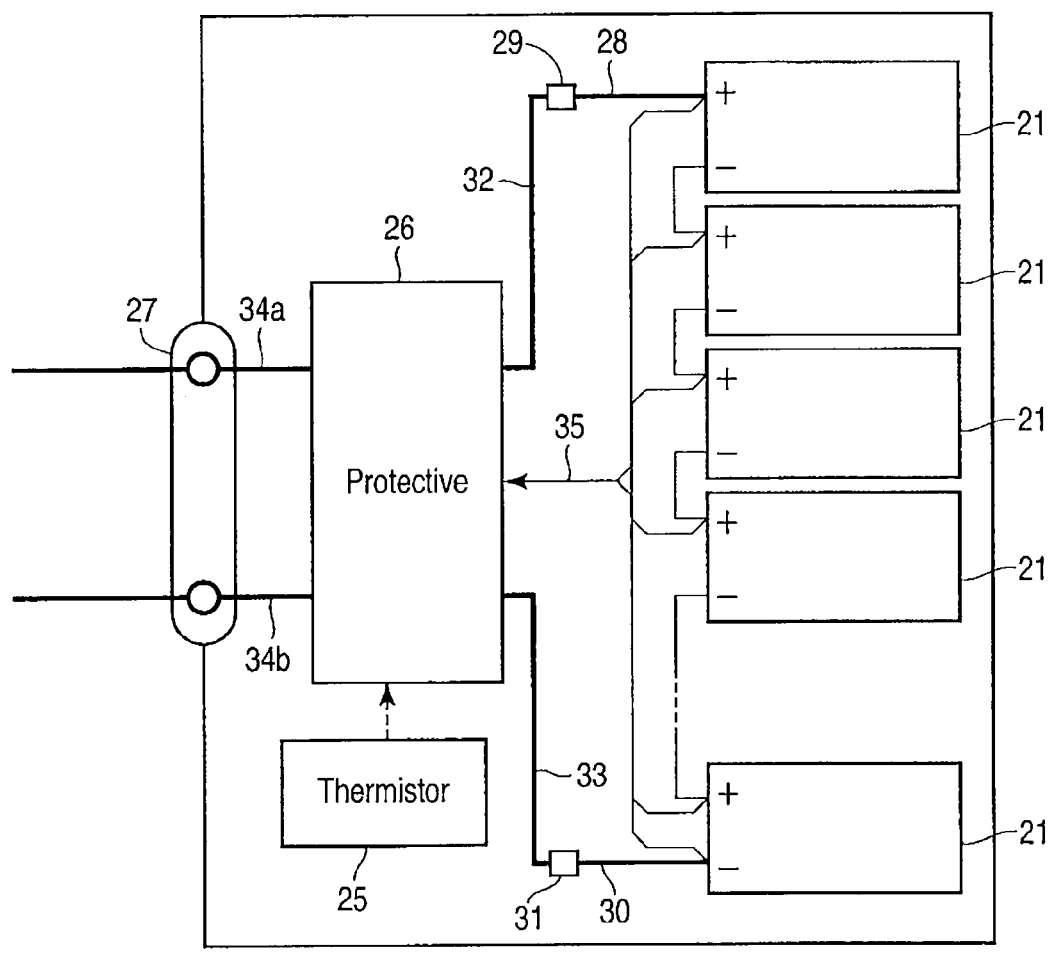
F I G. 4

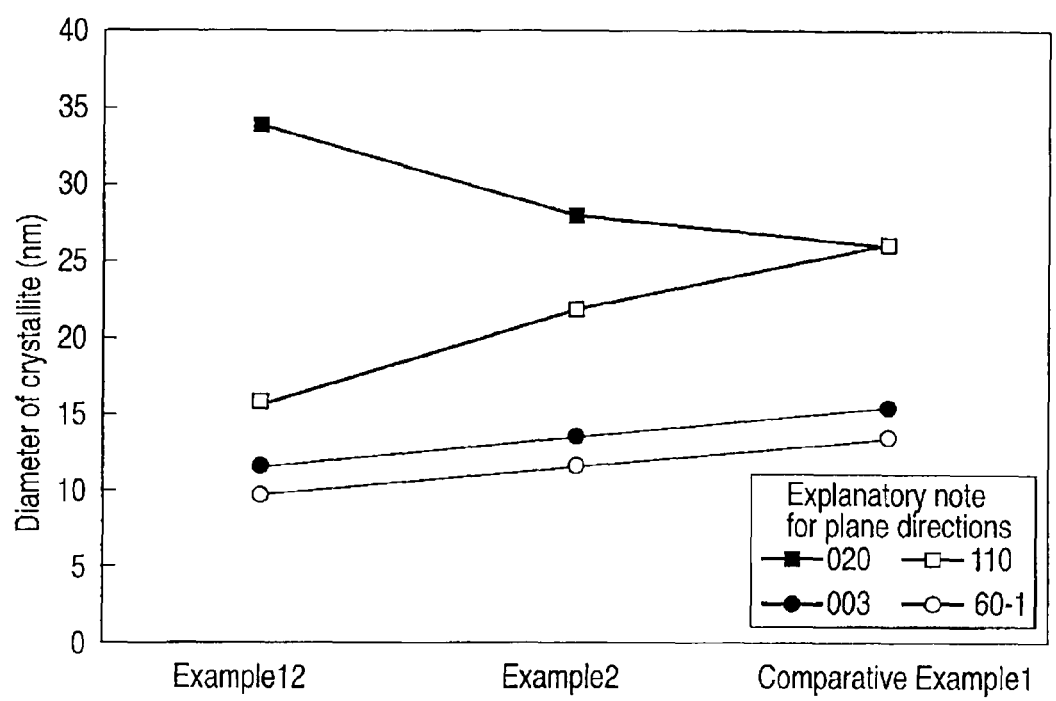
F I G. 6

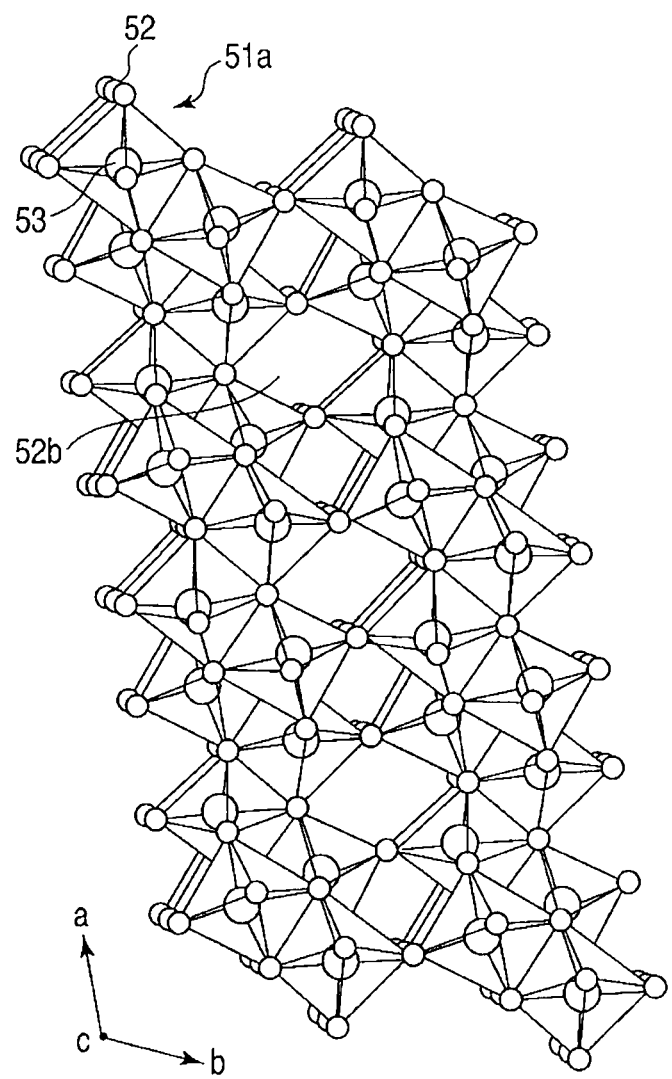
F I G. 7

ACTIVE MATERIAL FOR BATTERIES, NON-AQUEOUS ELECTROLYTE BATTERY, AND BATTERY PACK

CROSS REFERENCE TO RELATED APPLICATIONS

This application is a Continuation Application of PCT Application No. PCT/JP2009/063106, filed Jul. 22, 2009, the entire contents of which are incorporated herein by reference.

FIELD

Embodiments described herein relate generally to an active material for batteries, a non-aqueous electrolyte battery and a battery pack.

BACKGROUND

Titanium oxide having a monoclinic β-type structure represented by $TiO_2(B)$ has recently attracted attention as an active material for a non-aqueous electrolyte battery (see JP-A 2008-34368 (KOKAI), JP-A 2008-117625 (KOKAI) and WO 2009/028553 A1). Spinel type lithium titanate ($Li_4Ti_5O_{12}$), which is currently in practical use, is limited to 3 in the number of lithium ions which can be inserted and desorbed per unit chemical formula. For this reason, the number of lithium ions which can be inserted and desorbed per titanium ion is 3/5 (0.6) which is a theoretical maximum. In the case of $TiO_2(B)$, on the other hand, the number of lithium ions which can be inserted and desorbed per titanium ion is 1.0 at maximum. Therefore, $TiO_2(B)$ has a theoretical capacity as high as about 335 mAh/g.

However, the practical electrode capacity of $TiO_2(B)$ is about 170 to 200 mAh/g, which is significantly lower than the theoretical capacity as disclosed in JP-A 2008-34368 (KOKAI) and JP-A 2008-117625 (KOKAI). It is thought that this is because, though there are many sites which can serve as Li hosts in a crystal structure of $TiO_2(B)$, effective mobile Li ions are reduced because the diffusibility of Li ions in a solid is low.

BRIEF DESCRIPTION OF THE DRAWINGS

FIG. 1 is a cross-sectional view showing a flat-type non-aqueous electrolyte battery according to embodiments;

FIG. 2 is an enlarged sectional view of an A portion of FIG. 1;

FIG. 3 is an exploded perspective view showing a battery pack according to the embodiments;

FIG. 4 is a block diagram of the battery pack of FIG. 3;

FIG. 6 is a view showing diameters of the crystallite in the four plane directions of the titanium composite oxides of Examples 1 and 2 and Comparative Example 1; and FIG. 7 is a pattern diagram showing a crystal structure of a monoclinic β-type titanium oxide ($TiO_2(B)$).

DETAILED DESCRIPTION

Figure 5:
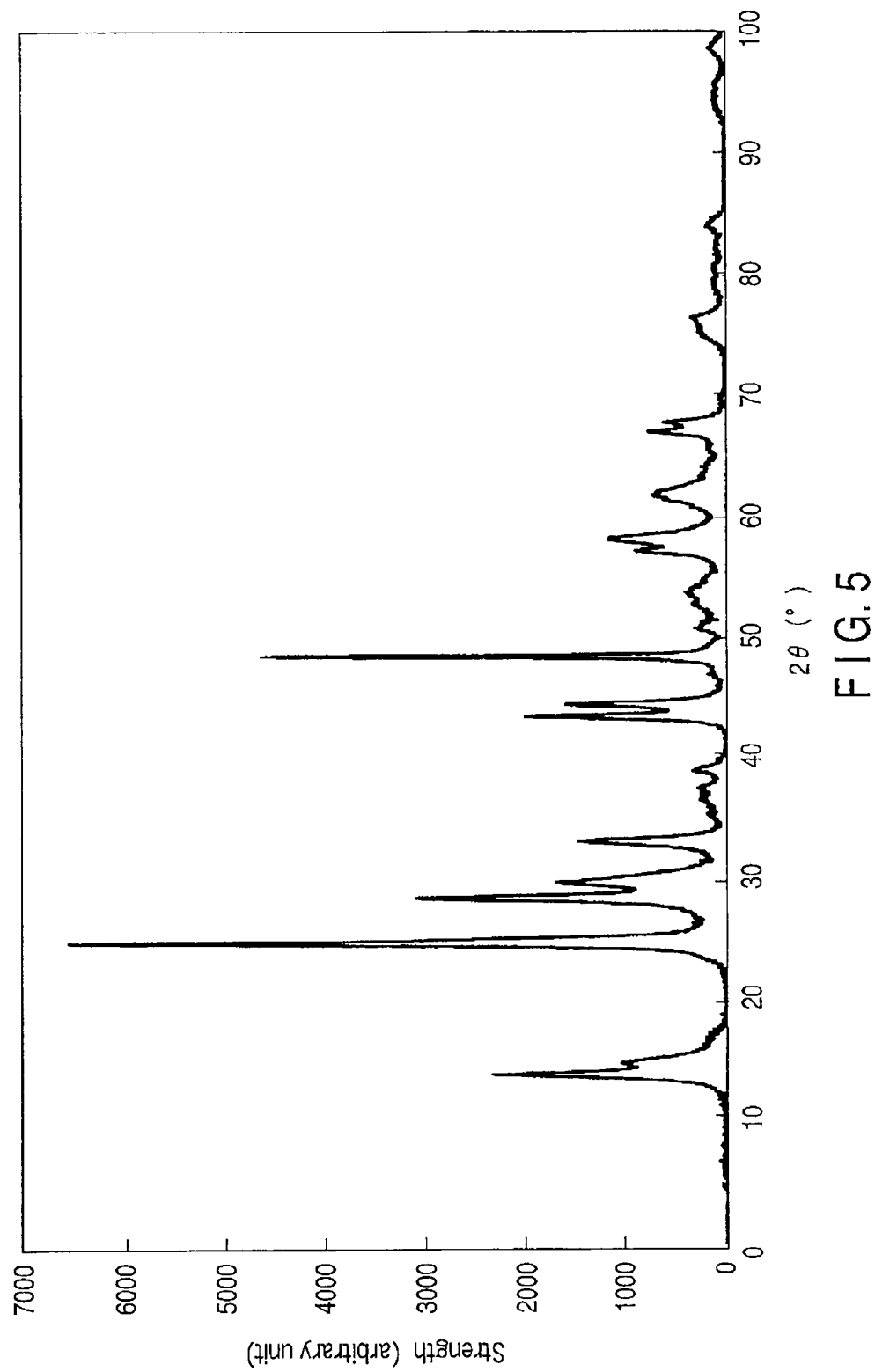
FIG. 5 is a view showing X-ray-analysis patterns of titanium composite oxide of Example 1.

Hereinafter, the active material for batteries, the non-aqueous electrolyte battery, and the battery pack according to the embodiments will be described.

In general, according to one embodiment, an active material for batteries comprises the monoclinic β-type titanium composite oxide having a crystallite. The monoclinic β-type titanium composite oxide has a first diameter of the crystallite calculated from a peak present at an angle 2θ of 48 to 49° and a second diameter of the crystallite calculated from a peak present at an angle 2θ of 24 to 26°, by the wide-angle X-ray diffraction method using an X-ray source CuKα ray. The first diameter of the crystallite is defined as X and the second diameter of the crystallite is defined as Y, X is larger than Y.

The wide-angle X-ray diffraction method will be described hereinafter.

The inside of a holder with a depth of 0.2 mm of a glass sample plate is filled with a powder (sample) obtained by pulverizing a monoclinic β-type titanium composite oxide. A glass plate is placed on the powder and pressed with fingers from above under a pressure of several tens to hundreds of MPa, thereby smoothing the surface of the sample filled in the glass sample plate. At this time, special care must be taken to fill the sample sufficiently in the holder and to avoid a lack (cracks and voids) in the amount of the sample to be filled. The sample is filled into the holder in the same level (0.2 mm) as the top of the holder and care is taken to prevent any rises and dents from the basic plane of the glass holder.

The following method is more preferably adopted to exclude any displacement in position of diffraction ray peaks and variation in ratio of intensities that are caused by filling the powder into the glass sample plate. That is, a pressure of about 250 MPa is applied to the above sample for 15 minutes to produce a pressured powder pellet having a diameter of 10 mm and a thickness of about 2 mm, and the surface of the pellet is measured.

Measurement by a wide-angle X-ray diffraction method is as follows.

<Measurement Method>

The sample is filled in a standard glass holder having a diameter 25 mm and measured by the wide-angle X-ray diffraction method. Measurement devices and conditions are shown below. The measurement is performed at room temperature in the atmosphere (18 to 25° C.).

(1) X-ray diffractometer: manufactured by Bruker AXS; D8 ADVANCE (seal tube type)
   X-ray source: CuKα ray (an Ni filter used)
   Output: 40 kV, 40 mA
   Slit system: Div. Slit; 03°
   Detector: LynxEye (high-speed detector)
(2) Scan system 2θ/θ: continuous scan
(3) Measurement range (2θ): 5 to 100°
(4) Step width (2θ): 0.01712°
(5) Counting time: 1 second/step <Analysis and Calculation of Crystallite Size>

A first diameter and a second diameter of the crystallite as a crystallite size can be calculated by using the Scherrer equation shown below from the half-value width of a peak present at an angle 2θ of 48 to 49° and from the half-value width of a peak present at an angle 2θ of 24 to 26° based on the X-ray diffraction pattern. The X-ray diffraction pattern is obtained by the wide-angle X-ray diffraction method.

$$\text{Crystallite size(nm)} = \frac{K\lambda}{\beta \cos\theta}$$

$$\beta = \sqrt{\beta_e^2 - \beta_o^2}$$

Here, K=0.9, λ(=0.15406 nm), βe: Half value width of the diffraction peak, β0: Correction value (0.07°) of the half value width.

The method of calculating the diameter of the crystallite in the active material for batteries synthesized is as described above. As for the analysis of the negative electrode (uncharged state) before the fabrication of a battery processed (coating and rolling) to form electrodes, the surface of the negative electrode is measured in the above manner, thereby making it possible to calculate the diameter of the crystallite in the active material for batteries by the same procedures.

On the other hand, the diameter of the crystallite in the negative electrode of a completed battery can be calculated by the following procedures. The completed battery is discharged to the rated terminal voltage under 0.1 C current in an environment of 25° C. The discharged battery is disintegrated in an inert gas atmosphere (or in the atmosphere) to cut out the negative electrode from the center of the electrode group. The cut negative electrode is thoroughly washed with ethylmethyl carbonate to remove the electrolyte components. Then, the negative electrode is allowed to stand in the atmosphere for one day (or washed with water) to be deactivated. The negative electrode in this condition may be measured as above to calculate the diameter of the crystallite in the active material for batteries in the same manner.

A crystal structure of monoclinic titanium dioxide is designated as $TiO_2(B)$. The crystal structure represented by $TiO_2(B)$ mainly belongs to a space group C2/m and has a tunnel structure exemplified in FIG. 7. The detailed crystal structure of $TiO_2(B)$ is described in the reference of R. Marchand. L. Brohan, M. Tournoux, Material Research.

As shown in FIG. 7, the crystal structure represented by TiO2(B) has skeleton structures 51a which are each constituted of a titanium ion 53 and an oxide ion 52 and are alternately arranged side by side. A space 52b is formed between these skeleton structures 51a. This space part 52b is allowed to serve as a host site for the insertion of heteroatom species. TiO2(B) is said to also have host sites capable of absorbing and desorbing heteroatom species on the surface of the crystal. When lithium ions are inserted into and desorbed from these host sites in this manner, TiO2(B) can absorb and desorb lithium ions reversibly.

When lithium ions are inserted into the spaces 52b, Ti4+ forming the skeleton is reduced to Ti3+, thereby maintaining an electrically neutral state of the crystal. Because TiO2(B) has one Ti4+ per chemical formula, it is theoretically possible to insert up to one lithium ion between layers. For this reason, titanium oxide compounds having a crystal structure of TiO2(B) may be represented by the formula $Li_xTiO2$ ($0 \leq x \leq 1$). In this case, each of these titanium oxide compounds ensures a theoretical capacity of 335 mAh, which is nearly two times that of titanium dioxide, as described in JP-A 2008-34368 (KOKAI) and JP-A 2008-117625 (KOKAI). However, the practical electrode capacity of TiO2(B) is about 170 to 200 mAh/g, which is significantly lower than the theoretical capacity, as described above. It is thought that this is because, though there are many sites which can serve as Li hosts in a crystal structure of TiO2(B), because the diffusibility of lithium ions in a solid is low, lithium ions which are inserted into and desorbed from Li sites are effectively decreased.

$TiO_2(B)$ included in the active material according to the embodiments has a first diameter of the crystallite calculated from a peak present at an angle 2θ of 48 to 49° and a second diameter of the crystallite calculated from a peak present at an angle 2θ of 24 to 26°, by the wide-angle X-ray diffraction method using an X-ray source CuKα ray. When the first diameter is defined as X and the second diameter is defined as Y, X is larger than Y. Incorporation of the $TiO_2(B)$ as an active material of the non-aqueous electrolyte battery contributes to high capacity and excellent large current characteristics.

A standard X ray diffraction pattern of TiO2(B) is described in JCPDS46-1237 or 46-1238, a peak appearing at 2θ of 24 to 26° is a main peak which belongs to a (110) surface of TiO2(B), and a peak appearing at 2θ of 48 to 49° belongs to a (020) surface of TiO2(B). In the X-ray diffraction patterns shown in FIG. 5 which is exemplified in Example 1 to be described later, the first and the second diameters of the crystallite can be calculated from respective clear peaks to be detected. Among these peaks, the peak appearing at 2θ of 48 to 49° belongs to the (020) surface of TiO2(B) and the first diameter of the crystallite calculated from the peak is found to be significantly large as compared with the diameters of the crystallite calculated from other peaks. The fact that the first diameter of the peak appearing at 2θ of 48 to 49° is large means that a unit lattice is preferentially arranged in a vector direction of the (020) surface (direction perpendicular to the (020) surface). That is, there is a shape anisotropy in which the unit lattice is preferentially arranged in the vector direction of the (020) surface as compared with other surfaces, for example, the (110) surface. The surface obtained by cutting the crystal by the (020) surface can be shown by a pattern diagram similar to FIG. 7 described above. The TiO2(B) according to the embodiments is in a state where the (020) surface is preferentially stacked in a c axis direction shown in FIG. 7 (direction perpendicular to a surface of paper). As is clear from FIG. 7, there are many large spaces 52b for inserting and desorbing lithium ions on the (020) surface. Thus, it is considered that when the unit lattice is preferentially arranged in the vector direction of the (020) surface (direction perpendicular to the (020) surface), lithium ions are smoothly diffused in the TiO2(B) through a multitude of the spaces 52b of the (020) surface and the diffusion rate is faster than those of other surfaces (for example, the (110) surface).

As a result, in the case of the $TiO_2(B)$ with such characteristics, lithium ions which are inserted into and desorbed from an Li site are effectively increased by excellent diffusibility of lithium ions in a solid. Thus, a higher capacity of the non-aqueous electrolyte battery including the $TiO_2(B)$ as the active material can be intended. Since the insertion and desorption of lithium ions in an electrode (for example, a negative electrode) including the $TiO_2(B)$ with the characteristics are rapidly performed, the non-aqueous electrolyte battery which includes the $TiO_2(B)$ as the active material can improve large current characteristics.

As for $TiO_2(B)$, in the diameter the crystallite calculated by the wide-angle X-ray diffraction method using an X-ray source CuKα ray, when a first diameter of the crystallite calculated from a peak present at an angle 2θ of 48 to 49° is defined as X and a second diameter of the crystallite calculated from a peak present at an angle 2θ of 24 to 26° is defined as Y, X and Y more preferably satisfy the relationship of Equation (1) below.

$$X/Y \geq 1.27 \tag{1}$$

A non-aqueous electrolyte battery that includes $TiO_2(B)$ in which the relationship between the first and the second diameters X and Y satisfies Equation (1) as an active material can further improve large current characteristics. A more preferred relationship between the first and the second diameters X and Y satisfies Equation (2) below.

$$1.27 \leq X/Y \leq 50 \tag{2}$$

When X/Y is more than 50, the particle diameter of $TiO_2(B)$ becomes large and a specific surface area is reduced. Thus, there is a possibility that a contact area of the active material and the electrolytic solution, namely an area which can absorb lithium ions may be reduced.

The first diameter X of the crystallite is preferably 20 nm or more. When the first diameter X is less than 20 nm, a percentage in which the unit lattice is preferentially arranged in the vector direction of the (020) surface is reduced, which could lead to impaired large current characteristics. More preferably, the first diameter X is 30 nm or more and 1 μm or less. $TiO_2(B)$ with the first diameter X can allow diffusion of lithium ions in solid to be progressed smoothly.

A primary particle diameter of $TiO_2(B)$ is preferably 30 nm or more and 1 μm or less. When the diameter is 30 nm or more, industrial production handling is easy. The case where the diameter is 1 μm or less can allow diffusion of lithium ions in solid to be progressed smoothly.

$TiO_2(B)$ has preferably a specific surface area of 5 m²/g or more and 50 m²/g or less. When $TiO_2(B)$ has a specific surface area of 5 m²/g or more, sites for absorption and desorption of lithium ions are sufficiently ensured. When $TiO_2(B)$ has a specific surface area of 50 m²/g or less, industrial production handling is easy.

$TiO_2(B)$ may include 1000 mass-ppm or less of unavoidable production impurities.

Next, a method of producing an active material for batteries according to the embodiments will be described.

First, an alkali titanate compound such as $Na_2Ti_3O_7$, $K_2Ti_4O_9$ or $Cs_2Ti_5O_{12}$ is prepared as a starting material. The alkali titanate compound can be obtained by mixing a substance containing Ti with a substance containing alkali elements such as Na, K, and Cs at a predetermined ratio and synthesizing by a general solid reaction method. The synthesis of the starting material does not have restrictions according to the procedure and crystal form. Potassium titanate of $K_2Ti_4O_9$ can be synthesized, for example, by a flux method.

The starting material is sufficiently washed with pure water to remove impurities from the alkali titanate compound, followed by an acid treatment to exchange alkali cations with protons. Each sodium ion, potassium ion, and cesium ion in sodium titanate, potassium titanate, and caesium titanate can be exchanged with a proton without destroying the crystal structure. The proton exchange by acid treatment is performed by, for example, adding hydrochloric acid of concentration 1M to the starting material and stirring it. It is desirable that the acid treatment is carried out until proton exchange is fully completed. During the proton exchange, the pH may be adjusted by adding an alkaline solution or an acidic solution to the solution. The washing with pure water is performed again after the completion of the proton exchange.

It is preferable that the starting material is milled in advance by a ball mill before the proton exchange. This milling enables a smooth proton exchange. With regard to milling conditions, the milling can be performed by using zirconia balls having a diameter of about 10 to 15 mm and by rotating the zirconia balls at 600 to 1000 rpm for about 1 to 3 hours. The milling for 1 hour or less is undesirable because the starting material is insufficiently milled. Further, the milling for a long time such as more than three hours, especially more than 6 hours is undesirable because a mechanochemical reaction proceeds, causing phase separation into a compound different from an intended product.

Then, the product obtained after the proton exchange is finished is washed with water and dried to synthesize a proton exchanger, which is an intermediate product. Then, $TiO_2(B)$ is produced by subjecting the proton exchanger to a heating process.

The temperature of the heating process is preferably from 250° C. to 800° C. As for the heating process, the rate of temperature increase to 400° C. is preferably reduced. When the rate of temperature increase is high, a dehydration process becomes uneven and it is difficult to synthesize uniform $TiO_2$(B). The rate of temperature increase is preferably 200° C./hour or less. The lower limit of the rate of temperature increase is not limited. From the viewpoint of productivity, the lower limit of the rate of temperature increase is preferably set to 10° C./hour.

More preferably, the heating process is performed by, for example, combining a first heating process at 250 to 500° C. and a second heating process at 500 to 800° C., i.e., a two-step heating process. The first heating process can progress uniform crystallization and the second heating process can improve crystallinity immediately while suppressing formation of impurity phases.

In the two-step heating process, when the temperature of the first heating process is less than 250° C., the crystallinity is reduced and the contamination of an impurity phase such as $H_2Ti_8O_{17}$ increases. This may lead to cause reduction in the electric capacity. When the temperature of the second heating process is more than 800° C., the crystallinity is improved and the impurity phase such as $H_2Ti_8O_{17}$ decreases. However, contamination of another impurity phase such as an anatase-type $TiO_2$ phase increases, which may lead to cause reduction in the electric capacity. The heating process time at a constant temperature may be about 30 minutes or more and 24 hours or less, preferably from 1 hour to 3 hours.

The two-step heating process can improve the crystallinity while suppressing the contamination of impurity phases. However, the specific surface area tends to decrease during the second heating process at high temperatures. In order to improve the crystallinity while maintaining the specific surface area in the first heating process, it is preferable that the substance after the first heating process is coated with the carbon precursor and then the second heating process is performed. The coating of the carbon precursor can be performed by, for example, the following method.

A predetermined amount of saccharose is added to pure water, which is dissolved, and further a solution diluted with ethanol is prepared. A carbon precursor-coated substance can be obtained by pouring the substance after the first heating process into this diluted solution and volatilizing it while being stirred.

Since sintering between substances (between particles) can be suppressed during the second heating process by coating the substance after the first heating process with a carbon precursor, it is possible to maintain the specific surface area after the first heating process. When the second heating process is performed in the atmosphere, the carbon precursor disappears with progression of the second heating process, which enables production of solely an intended $TiO_2(B)$. When the second heating process is performed in an inert atmosphere, it is possible to produce carbon-coated $TiO_2(B)$.

The active material for batteries according to the embodiments can be used not only for the negative electrode to be described later but also for the positive electrode. Even when it is used for either of them, it contributes to high capacity of the active material and improvement in large current characteristics when it is used for batteries.

When the active material for batteries according to the embodiments is used for the positive electrode, usable examples of the active material of the negative electrode as a counter electrode include carbon-based materials such as metal lithium, a lithium alloy or graphite, and cokes.

Subsequently, the non-aqueous electrolyte battery according to the embodiments will be described.

The non-aqueous electrolyte battery according to the embodiments comprises a case, a positive electrode housed in the case, a negative electrode which is housed in the case and which is spatially apart from the positive electrode in the case, for example, being housed by intervening a separator between the electrodes, and contains an active material, and a non-aqueous electrolyte filled in the case. Hereinafter, the case, the negative electrode, the positive electrode, the separator, and the non-aqueous electrolyte which are constituted members of the non-aqueous electrolyte battery will be described in detail.

1) Case

The case is formed of a laminate film having a thickness of 0.5 mm or less. As the casa, a metal case having a thickness of 1.0 mm or less is used. It is more preferable that the metal case has a thickness of 0.5 mm or less.

Examples of the shape of the case include a flat type (thin type), a square shape, a cylindrical type, a coin type, and a button type. As the case, for example, a case for small batteries which is loaded on a portable electronic device or a case for large batteries which is loaded on a two- or four-wheeled vehicle is used depending on the battery size.

As the laminate film, a multilayer film in which a metal layer is intervened between resin layers is used. The metal layer is preferably an aluminum foil or an aluminum alloy foil in order to reduce weight. As the resin layer, for example, polymer materials such as polypropylene (PP), polyethylene (PE), nylon, and polyethylene terephthalate (PET) can be used. The laminate film can be molded into a case shape by performing heat sealing.

The metal case is made of aluminum or an aluminum alloy. As the aluminum alloy, an alloy containing elements such as magnesium, zinc, and silicon is preferred. When transition metals such as iron, copper, nickel, and chromium are included in an alloy, the amount is preferably set to 100 mass-ppm or less.

2) Negative Electrode

The negative electrode comprises a collector and a negative electrode layer formed on one side or both sides of the collector and comprising an active material, a conductive agent, and a binder.

As the active material, an active material for batteries which comprises the monoclinic β-type titanium composite oxide having a crystallite is used. The monoclinic β-type titanium composite oxide has a first diameter of the crystallite calculated from a peak present at an angle 2θ of 48 to 49° and a second diameter of the crystallite calculated from a peak present at an angle 2θ of 24 to 26°, by the wide-angle X-ray diffraction method using an X-ray source CuKα ray. The first diameter of the crystallite is defined as X and the second diameter of the crystallite is defined as Y, X is larger than Y. It is preferable that the relationship between the first and the second diameters X and Y satisfies Equation (1) or (2) described above.

As for the monoclinic β-type titanium composite oxide, lithium ions are smoothly diffused in $TiO_2(B)$ through the (020) surface as described above and the diffusion rate is faster than that of another surface (for example, the (110) surface). As a result, a non-aqueous electrolyte battery which comprises a negative electrode that includes the active material containing the monoclinic β-type titanium composite oxide has a high capacity and excellent large current characteristics.

The conductive agent improves the conductive performance of the active material and controls the contact resistance with the collector. Examples of the conductive agent include acetylene black, carbon black, and graphite.

The binder can bind the conductive agent to the active material. Examples of the binder include polytetrafluoroethylene (PTFE), polyvinylidene fluoride (PVdF), fluorine-based rubber, and styrene butadiene rubber.

It is preferable that the blending proportion of the active material, the conductive agent, and the binder in the negative electrode layer is respectively 70% by weight or more and 96% by weight or less, 2% by weight or more and 28% by weight or less, and 2% by weight or more and 28% by weight or less. When the amount of the conductive agent is less than 2% by weight, the conductive performance of the negative electrode layer is reduced and thus the large current characteristics of the non-aqueous electrolyte battery may be led to be reduced. When the amount of the binder is less than 2% by weight, binding properties of the negative electrode layer and the collector are reduced and thus cycle characteristics may be led to be reduced. On the other hand, it is preferable to allow the amounts of the conductive agent and the binder to be 28% by weight or less in order to achieve high capacity.

The collector is preferably an aluminum foil that is electrochemically stable in a potential range higher than 1.0 V or an aluminum alloy foil containing elements such as Mg, Ti, Zn, Mn, Fe, Cu, and Si.

The negative electrode is produced by suspending, for example, an active material, a conductive agent, and a binder in a widely used solvent to prepare a slurry, applying the slurry to the collector, drying it, and pressing it. Further, the negative electrode may be produced by allowing the active material, the conductive agent, and the binder to be formed into a pellet shape to form a negative electrode layer and forming the negative electrode on the collector.

3) Positive Electrode

The positive electrode comprises a collector and a positive electrode layer formed on one side or both sides of the collector and comprising an active material, a conductive agent, and a binder.

Examples of the active material include oxides and polymers can be used.

Usable examples of the oxide include absorbed lithium manganese dioxide ($MnO_2$), iron oxide, copper oxide, nickel oxide, and lithium manganese composite oxide (for example, $Li_xMn_2O_4$ or $Li_xMnO_2$), lithium nickel composite oxide (for example, $Li_xNiO_2$), lithium cobalt composite oxide ($Li_xCoO_2$), lithium nickel cobalt composite oxide (for example, $LiNi_{1-y}CO_yO_2$), lithium manganese cobalt composite oxide (for example, $Li_xMn_yCO_{1-y}O_2$), spinel-type lithium manganese nickel composite oxide ($Li_xMn_{2-y}Ni_yO_4$), lithium phosphorus oxide having an olivine structure (for example, $Li_xFePO_4$, $Li_xFe_{1-y}Mn_yPO_4$, $Li_xCoPO_4$), iron sulfate ($Fe_2(SO_4)_3$), and vanadium oxide (for example, $V_2O_5$). Here, it is preferable that x is more than 0 and 1 or less and y is 0 or more and 1 or less.

Examples of the polymer include conductive polymer materials such as polyaniline and polypyrrole or disulfide-based polymer materials. Sulfur (S) and carbon fluoride can also be used as the active material.

Preferred examples of the active material include lithium manganese composite oxide having a high positive electrode voltage ($Li_xMn_2O_4$), lithium nickel composite oxide ($Li_xNiO_2$), lithium cobalt composite oxide ($Li_xCoO_2$), lithium nickel cobalt composite oxide ($Li_xNi_{1-y}CoyO_2$), spinel-type lithium manganese nickel composite oxide ($Li_xMn_{2-y}Ni_yO_4$), lithium manganese cobalt composite oxide ($Li_xMn_yCO_{1-y}O_2$), and lithium iron phosphate ($Li_xFePO_4$). Here, it is preferable that x is more than 0 and 1 or less and y is 0 or more and 1 or less.

Further, a more preferred active material is lithium cobalt composite oxide or lithium manganese composite oxide. Since these active materials have high ion conductivity, in the above combination with the negative electrode active material, diffusion of lithium ions in the positive active material is unlikely to be a rate-determining step. Thus, the active materials are excellent in compatibility with the lithium titanium composite oxide in the negative electrode active material.

The active material has preferably a primary particle diameter of 100 nm to 1 μm. When the primary particle diameter is 100 nm or more, industrial production handling is easy. The case where the primary particle diameter is 1 μm or less can allow diffusion of lithium ions in solid to be progressed smoothly.

The active material has preferably a specific surface area of 0.1 m$^2$/g or more and 10 m$^2$/g or less. When the active material has a specific surface area of 0.1 m$^2$/g or more, sites for absorption and desorption of lithium ions are sufficiently ensured. When the active material has a specific surface area of 10 mm$^2$/g or less, the industrial production handling is easy and a good charge and discharge cycle performance can be ensured.

The conductive agent improves the conductive performance of the active material and controls the contact resistance with the collector. Examples of the conductive agent include carbonaceous materials such as acetylene black, carbon black, and graphite.

The binder allows the conductive agent to be bound to the active material. Examples of the binder include polytetrafluoroethylene (PTFE), polyvinylidene fluoride (PVdF), and fluorine-based rubber.

It is preferable that the blending proportion of the active material, the conductive agent, and the binder in the positive electrode layer is respectively 80% by weight or more and 95% by weight or less, 3% by weight or more and 18% by weight or less, and 2% by weight or more and 17% by weight or less. The conductive agent with an amount of 3% by weight or more can exhibit the above effect. When the amount of the conductive agent is 18% by weight or less, decomposition of the non-aqueous electrolyte on a surface of the conductive agent under high temperature storage can be reduced. When the amount of the conductive agent is 2% by weight or more, sufficient positive electrode strength is obtained. When the amount of the conductive agent is 17% by weight or less, the blending amount of the binder, which is an insulating material, in the positive electrode is reduced and thus the internal resistance can be reduced.

For example, the collector is preferably an aluminum foil or an aluminum alloy foil containing elements such as Mg, Ti, Zn, Mn, Fe, Cu, or Si.

The positive electrode is produced by suspending, for example, an active material, a conductive agent, and a binder in a widely used solvent to prepare a slurry, applying the slurry to the collector, drying it, and pressing it. Further, the positive electrode may be produced by allowing the active material, the conductive agent, and the binder to be formed into a pellet shape to form a negative electrode layer and forming the negative electrode on the collector.

4) Non-Aqueous Electrolyte

Examples of the non-aqueous electrolyte include a liquid non-aqueous electrolyte prepared by dissolving an electrolyte in an organic solvent or a gel non-aqueous electrolyte obtained by making a composite of a liquid electrolyte and a polymer material.

As for the liquid non-aqueous electrolyte, it is preferable that the electrolyte with a concentration of 0.5 M to 2.5 M is dissolved in the organic solvent.

Examples of the electrolyte include lithium perchlorate (LiClO$_4$), lithium hexafluorophosphate (LiPF$_6$), lithium tetrafluoroborate (LiBF$_4$), and arsenic lithium hexafluoride (LiAsF$_6$), lithium trifluoromethansulfonate (LiCF$_3$SO$_3$), lithium-bis trifluoromethylsulfonylimide [LiN(CF$_3$SO$_2$)$_2$] or mixtures of these compounds. The electrolyte is preferably one which is only slightly oxidized even at a high potential, and LiPF$_6$ is most preferable.

Examples of the organic solvent include cyclic carbonates such as propylene carbonate (PC), ethylene carbonate (EC), and vinylene carbonate; chain carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); chain ethers such as dimethoxyethane (DME) and diethoethane (DEE); γ-butyrolactone (GBL), acetonitrile (AN), and sulfolane (SL). These organic solvents can be used alone or in the form of a mixed solvent.

Examples of the polymer material include polyvinylidene fluoride (PVdF), polyacrylonitrile (PAN), and polyethylene oxide (PEO).

Preferred examples of the organic solvents include a mixed solvent obtained by mixing at least two of the group consisting of propylene carbonate (PC), ethylene carbonate (EC), and (diethyl carbonate (DEC)) and a mixed solvent containing γ-butyrolactone (GBL).

5) Separator

Examples of the separator include porous films including polyethylene, polypropylene, cellulose, or polyvinylidene fluoride (PVdF) and nonwoven fabrics made of synthetic resins. A preferred porous film is made of polyethylene or polypropylene and it is possible to interrupt currents by melting the film at a constant temperature, and thus the safety can be improved.

Subsequently, the non-aqueous electrolyte battery according to the embodiments (for example, a flat-shaped non-aqueous electrolyte battery with an case composed of a laminate film) will be more specifically described with reference to FIGS. 1 and 2. FIG. 1 is a cross-sectional view of a thin type non-aqueous electrolyte battery and FIG. 2 is an enlarged sectional view of the A portion of FIG. 1. Each of these drawings is a pattern diagram for description and clarification of the invention. Though there are parts different from an actual battery in shape, dimension and ratio, these structural designs may be appropriately changed taking explanations below and known technologies into consideration.

A flat, spiral electrode group 1 is housed in a bag-shaped case 2 composed of a laminate film in which an aluminum foil is intervened between two resin layers. The flat, spiral electrode group 1 is formed by spirally winding a laminate by stacking a negative electrode 3, a separator 4, a positive electrode 5, and the separator 4 in this order from the outside and subjecting it to press-molding. The negative electrode 3 of an outermost shell has a configuration in which a negative electrode layer 3b is formed on one side of the inner surface of a negative electrode collector 3a as shown in FIG. 2. The other negative electrode 3 is configured by forming the negative electrode layer 3b on both sides of the negative electrode collector 3a. As the active material in the negative electrode layer 3b, the active material for batteries which includes the above monoclinic β-type titanium composite oxide is used. The monoclinic β-type titanium composite oxide has a first diameter of the crystallite calculated from a peak present at an angle 2θ of 48 to 49° and a second diameter of the crystallite calculated from a peak present at an angle 2θ of 24 to 26°, by the wide-angle X-ray diffraction method using an X-ray source CuKα ray. The first diameter of the crystallite is defined as X and the second diameter of the crystallite is defined as Y, X is larger than Y. The positive electrode 5 is configured by forming the positive electrode layers 5b on both sides of a positive electrode current collector 5a.

In a vicinity of a peripheral edge of the flat, spiral electrode group 1, a negative electrode terminal 6 is connected to the negative electrode collector 3a of the negative electrode 3 of an outermost shell, and a positive electrode terminal 7 is connected to the positive electrode current collector 5a of the positive electrode 5 at the inside. The negative electrode terminal 6 and the positive electrode terminal 7 are extended outwardly from an opening of the bag-shaped case 2. For example, liquid non-aqueous electrolyte is injected from the opening of the bag-shaped case 2. The flat, spiral electrode group 1 and the liquid non-aqueous electrolyte can be completely sealed by heat-sealing the opening of the bag-shaped case 2 across the negative electrode terminal 6 and the positive electrode terminal 7.

The negative electrode terminal is made of, for example, a material having electric stability and conductivity in a potential range 3.0 to 5.0V vs Li/Li. Specifically, aluminum or an aluminum alloy containing elements such as Mg, Ti, Zn, Mn, Fe, Cu, or Si is cited. It is preferable that the negative electrode terminal is formed of a material similar to that of the negative electrode collector in order to reduce the contact resistance with the negative electrode collector.

The positive electrode terminal is made of, for example, a material having electric stability and conductivity in a potential range 3.0 to 5.0V vs Li/Li$^+$. Specifically, aluminum or an aluminum alloy containing elements such as Mg, Ti, Zn, Mn, Fe, Cu, and Si is cited. It is preferable that the positive electrode terminal is formed of a material similar to that of the positive electrode collector in order to reduce the contact resistance with the positive electrode collector.

Subsequently, the battery pack according to the embodiments will be described in detail.

The battery pack according to the embodiments has a plurality of the non-aqueous electrolyte batteries (unit cells) and is arranged such that respective unit cells are electrically connected in series or parallel or both series and parallel to one another.

The battery pack has excellent cycle characteristics.

The monoclinic titanium dioxide included in the negative electrode active material has a first diameter of the crystallite calculated from a peak present at an angle 2θ of 48 to 49° and a second diameter of the crystallite calculated from a peak present at an angle 2θ of 24 to 26°, by the wide-angle X-ray diffraction method using an X-ray source CuKα ray. When the first diameter is defined as X and the second diameter is defined as Y, X is larger than Y, and the unit lattice is preferentially arranged in the vector direction of the (020) surface, and thus the non-aqueous electrolyte battery using the monoclinic titanium dioxide can improve large current characteristics. As a result, a battery pack in which a plurality of the batteries are incorporated can improve the charge and discharge cycle performance even when charge and discharge cycles are performed at high current levels.

Subsequently, the battery pack according the embodiments will be specifically described with reference to FIG. 3 and FIG. 4. The flat-type non-aqueous electrolyte battery shown in FIG. 1 is used as the unit cell.

An assembled battery 23 is configured by stacking a plurality of unit cells 21 so that the negative electrode terminal 6 and the positive electrode terminal 7 outwardly extended are arranged in the same direction and binding them with an adhesive tape 22. These unit cells 21 are electrically connected in series with one another as shown in FIG. 4.

A printed-circuit board 24 is arranged so as to face a side surface of the unit cells 21 where the negative electrode terminal 6 and the positive electrode terminal 7 are extended. A thermistor 25, protective circuit 26, and an energizing terminal 27 connected to external devices are mounted on the printed-circuit board 24, as shown in FIG. 4. An electric insulating plate (not shown) is attached to a surface of the protective circuit board 24 facing the assembled battery 23 in order to avoid unnecessary connection to wirings of the assembled battery 23.

A positive electrode side lead 28 is connected to the positive electrode terminal 7 located on an undermost layer of the assembled battery 23. The distal end is inserted into a positive electrode side connector 29 of the printed-circuit board 24 so as to be electrically connected thereto. A negative electrode side lead 30 is connected to the negative electrode terminal 6 located on a top layer of the assembled battery 23. The distal end is inserted into a negative electrode side connector 31 of the printed circuit board 24 so as to be electrically connected thereto. These connectors 29 and 31 are connected to the protective circuit 26 through wirings 32 and 33 formed on the printed-circuit board 24.

The thermistor 25 is used to detect the temperature of the unit cell 21 and the detection signals are transmitted to the protective circuit 26. The protective circuit 26 can shut off a plus side wiring 34a and a minus side wiring 34b between the protective circuit 26 and the energizing terminal 27 connected to external devices under a predetermined condition. The predetermined condition means, for example, the case where the temperature detected by the thermistor 25 is more than a predetermined temperature. Further, the predetermined condition means the case where overcharge, over-discharge and over-current and the like of the unit cell 21 are detected. The detection of this overcharge and the like is performed for individual unit cells 21 or whole unit cells 21. When individual unit cells 21 are detected, either the voltage of the battery may be detected or the potential of the positive electrode or negative electrode may be detected. In the latter case, a lithium electrode used as a reference electrode is inserted between individual unit cells 21. In the case of FIGS. 3 and 4, a wiring 35 for detecting voltage is connected to each unit cell 21 and the detected signals are transmitted to the protective circuit 26 through these wirings 35.

A protective sheet 36 made of a rubber or resin is disposed on each of the three side surfaces of the assembled battery 23 other than the side surface from which the positive electrode terminal 7 and the negative electrode terminal 6 are projected.

The assembled battery 23 is housed in a housing case 37 together with each protective sheet 36 and the printed-circuit board 24. That is, the protective sheets 36 are disposed on both inside surfaces in the direction of the long side and on inside surfaces in the direction of the short side of the housing case 37, and the printed-circuit board 24 is disposed on the other inside surface in the direction of the short side. The assembled battery 23 is positioned in a space enclosed by the protective sheets 36 and the printed-circuit board 24. A lid 38 is attached to the upper surface of the housing case 37.

Here, a heat-shrinkable tape may be used in place of the adhesive tape 22 to fix the assembled battery 23. In this case, after the protective sheets are disposed on both sides of the assembled battery, the heat-shrinkable tape is wound around the assembled battery, and the heat-shrinkable tape is contracted by heating to fasten the assembled battery.

The structure in which the unit cells 21 are connected in series is shown in FIGS. 3 and 4. However, either parallel or series-parallel cell connections may be used to increase the capacity of the battery. The assembled battery pack can further be connected in series or parallel.

Further, the structure of the battery pack is suitably changed according to its use. The battery pack is preferably used in applications exhibiting excellent cycle characteristics when a large current is extracted. Specific examples thereof include power sources for digital cameras, and power sources mounted on vehicles such as two- to four-wheel hybrid electric cars, two- to four-wheel electric cars and assist bicycles. The battery pack is preferably used for power sources mounted on vehicles.

As described above, a non-aqueous electrolyte battery with excellent high temperature characteristics can be obtained by using a non-aqueous electrolyte which includes the mixed solvent obtained by mixing at least two of the group consisting of propylene carbonate (PC), ethylene carbonate (EC), and diethyl carbonate (DEC) or γ-butyrolactone (GBL). The battery pack which comprises an assembled battery having a plurality of the non-aqueous electrolyte batteries is preferable, particularly for power sources mounted on vehicles.

Hereinafter, examples will is described, however, without departing from the spirit of the present invention, the present invention is not limited to the following examples.

Example 1

Production of Positive Electrode

First, 90% by weight of lithium nickel composite oxide ($LiNi_{0.82}Co_{0.15}Al_{0.03}O_2$) powder as a positive active material and 5% by weight of acetylene black and 5% by weight of polyvinylidene fluoride (PVdF) as conductive agents were added to and mixed with N-methyl pyrrolidone (NMP) to prepare a slurry. This slurry was applied to both surfaces of a current collector made of an aluminum foil having a thickness of 15 µm, dried, and pressed to produce a positive electrode having a positive electrode layer density of 3.15 g/cm$^3$.

<Synthesis of Titanium Composite Oxide>

First, potassium carbonate ($K_2CO_3$) and anatase-type titanium oxide ($TiO_2$) were mixed and the mixture was baked at 1,000° C. for 24 hours to synthesize $K_2Ti_4O_9$. The obtained $K_2Ti_4O_9$ was pulverized with zirconia beads under a dry condition for about three hours to adjust the grain size. Thereafter, the pulverized product was washed with pure water to prepare a proton exchange precursor. The obtained proton exchange precursor was poured into a hydrochloric acid solution of 1 M concentration and the solution was subjected to ultrasonic dispersion in an environment of 25° C. for 120 hours to obtain a proton exchanger.

The obtained proton exchanger was baked at 350° C. in air for three hours by increasing room temperature to 350° C. at a rate of temperature increase of 100° C./hour (the first heating process). Successively, the temperature was increased to 500° C. at a rate of temperature increase of 200° C./hour, and then the proton exchanger was baked at 500° C. for an hour (the second heating process). A titanium composite oxide was synthesized by the two-step heating process.

The obtained titanium composite oxide was subjected to XRD measurement under the above conditions. As a result, the X-ray diffraction patterns shown in FIG. 5 were obtained. A first diameter (X) of a crystallite calculated from a peak present at an angle 2θ of 48 to 49° and a second diameter (Y) of the crystallite calculated from a peak present at an angle 2θ of 24 to 26° were calculated from the X-ray diffraction patterns. Conditions during synthesis of titanium composite oxide are shown in Table 1 below. The first and the second diameters X and Y, and the results of X/Y are shown in Table 2 below.

<Production of Negative Electrode>

80% by weight of the obtained titanium composite oxide powder and 10% by weight of acetylene black and 10% by weight of polyvinylidene fluoride (PVdF) as conductive agents were added to and mixed with N-methyl pyrrolidone (NMP) to prepare a slurry. This slurry was applied to both surfaces of a current collector made of an aluminum foil having a thickness of 15 µm and dried, and then pressed to produce a negative electrode having a negative electrode layer density of 1.6 g/cm$^3$.

<Preparation of Liquid Non-Aqueous Electrolyte>

1 mol/L of $LiPF_6$ was dissolved as an electrolyte in a mixed solvent of ethylene carbonate (EC) and diethyl carbonate (DEC) (volumetric ratio is 1:2) to prepare a liquid non-aqueous electrolyte.

<Production of Electrode Group>

A positive electrode, a separator formed of a porous film having a thickness of 25 µm made of polyethylene, a negative electrode, and a separator were stacked in this order, and then spirally wound. The resultant product was hot-pressed at 90° C. to produce a flat-shaped electrode group having a width of 30 mm and a thickness of 1.8 mm. The obtained electrode group was housed in a pack formed of a laminate film having a thickness of 0.1 mm obtained by stacking and adhering, a stretched nylon film having a thickness of 25 µm, an aluminum sheet having a thickness of 40 µm, and a linear low density polyethylene film having a thickness of 30 µm in this order via a urethane-based adhesive, and subjected to vacuum drying at 80° C. for 24 hours.

A liquid non-aqueous electrolyte was injected into the lamination film pack with the electrode group housed and the pack was fully sealed by heat-sealing to fabricate a non-aqueous electrolyte secondary battery having the structure shown in FIG. 1, a width of 35 mm, a thickness of 2 mm, and a height of 65 mm.

Examples 2 to 5

Non-aqueous electrolyte secondary batteries were fabricated in the same manner as Example 1 except that the grinding time, the proton exchange time, the temperature and time of the first heating process, the rate of temperature increase, the temperature and time of the second heating process, and the rate of temperature increase were set to conditions shown in Table 1 below to synthesize a titanium composite oxide and the obtained titanium composite oxide was used as the active material of the negative electrode.

In Examples 3 to 5, a solution obtained by dissolving 3% by weight of saccharose in a pure water/ethanol mixed solution was prepared. The substance obtained by the first heating process was poured into this solution and the solvent was volatilized while being stirred to prepare a carbon precursor-coated substance. Then, this carbon precursor-coated substance was subjected to the second heating process.

Comparative Examples 1 to 3

Non-aqueous electrolyte secondary batteries were fabricated in the same manner as Example 1 except that the rate of temperature increase was 300° C./hour during performing the first heating process, the grinding time, the proton exchange time, and the time and temperature of the heating process (the first heating process) were set to conditions shown in Table 1 below to synthesize a titanium composite oxide and the obtained titanium composite oxide was used as the active material of the negative electrode.

As for the batteries of Examples 1 to 5 and Comparative Examples 1 to 3, the discharge capacity at 0.2 C and the discharge capacity at 2 C in an environment of 25° C. were measured, and a ratio (%) of the discharge capacity at 2 C to the discharge capacity at 0.2 C was calculated as a capacity maintenance rate (%). The results are shown in Table 2 below.

TABLE 1

|  | Grinding time [Time] | Proton exchange time [Time] | First heating process | | | Second heating process | |
|---|---|---|---|---|---|---|---|
|  |  |  | Temperature and time | Rate of temperature increase | Presence or absence of coating of carbon precursor | Temperature and time | Rate of temperature increase |
| Example 1 | 3 | 120 | 350° C., 3 hours | 100° C./hr | Absence | 500° C., 1 hour | 200° C./hr |
| Example 2 | 3 | 120 | 350° C., 3 hours | 100° C./hr | Absence | 600° C., 1 hour | 200° C./hr |
| Example 3 | 3 | 120 | 350° C., 3 hours | 100° C./hr | Presence | 500° C., 1 hour | 200° C./hr |
| Example 4 | 3 | 120 | 350° C., 3 hours | 100° C./hr | Presence | 600° C., 1 hour | 200° C./hr |
| Example 5 | 3 | 120 | 350° C., 3 hours | 100° C./hr | Presence | 700° C., 1 hour | 200° C./hr |
| Comparative Example 1 | 6 | 120 | 500° C., 1 hour | 300° C./hr | — | — | — |
| Comparative Example 2 | 6 | 120 | 600° C., 1 hour | 300° C./hr | — | — | — |
| Comparative Example 3 | 6 | 120 | 300° C., 1 hour | 300° C./hr | — | — | — |

TABLE 2

|  | First diameter (X) of crystallite [nm] | Second diameter (Y) of crystallite [nm] | X/Y | Capacity maintenance rate [%] |
|---|---|---|---|---|
| Example 1 | 27 | 21 | 1.29 | 83 |
| Example 2 | 28 | 22 | 1.27 | 83 |
| Example 3 | 32 | 21 | 1.52 | 86 |
| Example 4 | 34 | 22 | 1.55 | 90 |
| Example 5 | 42 | 23 | 1.83 | 92 |
| Comparative Example 1 | 26 | 26 | 1.00 | 70 |
| Comparative Example 2 | 31 | 38 | 0.82 | 62 |
| Comparative Example 3 | 15 | 19 | 0.79 | 51 |

Examples 6 to 12

Non-aqueous electrolyte secondary batteries were fabricated in the same manner as Example 1 except that the grinding time, the proton exchange time, and the time, temperature, and rate of temperature increase of the heating process (the first heating process) were set to conditions shown in Table 3 below to synthesize a titanium composite oxide and the obtained titanium composite oxide was used as the active material of the negative electrode.

The diameters of the crystallite in the four plane directions of the titanium composite oxides obtained in Examples 2 and 12 and Comparative Example 1 are shown in FIG. 6.

As for the batteries of Examples 6 to 12, the discharge capacity at 0.2 C and the discharge capacity at 2 C in an environment of 25° C. were measured, and a ratio (%) of the discharge capacity at 2 C to the discharge capacity at 0.2 C was calculated as a capacity maintenance rate (%). The results are shown in Table 4 below together with the results of the batteries of Comparative Examples 1 to 3.

TABLE 3

|  | Grinding time [Time] | Proton exchange time [Time] | First heating process | |
|---|---|---|---|---|
|  |  |  | Temperature and time | Rate of temperature increase |
| Example 6 | 1 | 120 | 300° C., 3 hours | 100° C./hr |
| Example 7 | 6 | 120 | 300° C., 3 hours | 100° C./hr |
| Example 8 | 1 | 120 | 350° C., 3 hours | 100° C./hr |
| Example 9 | 6 | 120 | 350° C., 3 hours | 100° C./hr |
| Example 10 | 3 | 24 | 350° C., 3 hours | 100° C./hr |
| Example 11 | 3 | 48 | 350° C., 3 hours | 100° C./hr |
| Example 12 | 3 | 120 | 350° C., 3 hours | 100° C./hr |
| Comparative Example 1 | 6 | 120 | 500° C., 1 hour | 300° C./hr |
| Comparative Example 2 | 6 | 120 | 600° C., 1 hour | 300° C./hr |
| Comparative Example 3 | 6 | 120 | 300° C., 1 hour | 300° C./hr |

TABLE 4

|  | First diameter (X) of crystallite [nm] | Second diameter (Y) of crystallite [nm] | X/Y | Capacity maintenance rate [%] |
|---|---|---|---|---|
| Example 6 | 19 | 15 | 1.27 | 80 |
| Example 7 | 26 | 14 | 1.86 | 85 |
| Example 8 | 26 | 18 | 1.44 | 84 |
| Example 9 | 36 | 17 | 2.12 | 90 |
| Example 10 | 29 | 13 | 2.23 | 86 |
| Example 11 | 32 | 15 | 2.13 | 88 |
| Example 12 | 34 | 16 | 2.13 | 91 |
| Comparative Example 1 | 26 | 26 | 1.00 | 70 |
| Comparative Example 2 | 31 | 38 | 0.82 | 62 |
| Comparative Example 3 | 15 | 19 | 0.79 | 51 |

As is clear from Tables 1 to 4, the batteries of Examples 1 to 72 formed by using a titanium composite oxide as a negative electrode active material, the titanium composite oxide having a first diameter of the crystallite calculated from a peak present at an angle 2θ of 48 to 49° and a second diameter of the crystallite calculated from a peak present at an angle 2θ of 24 to 26°, by the wide-angle X-ray diffraction method using an X-ray source CuKα ray, when the first diameter is defined as X and the second diameter is defined as Y, X is larger than Y, shows a high negative electrode volume and high capacity maintenance rate (good high current performance) as compared with the batteries of Comparative Examples 1 to 3 formed by using a titanium composite oxide in which the first and the second diameters X and Y have a relationship of X/Y≤1 as the negative electrode active material. It is found that particularly, the batteries of Examples 3 to 5, 9, 11, and 12 having the first diameter (X) of 30 nm or more show a higher capacity maintenance rate.

While the embodiments of the present invention have been described, the present invention is not limited thereto. Various modifications are possible within the spirit of the invention described in the claims. Further, the present invention can variously be modified in practical phases without departing from the spirit of the invention. Furthermore, various inventions can be formed by appropriately combining a plurality of constituent elements disclosed in the embodiments.

What is claimed is:

1. An active material for batteries comprising a monoclinic β-type titanium composite oxide having a crystallite,
   wherein the monoclinic β-type titanium composite oxide has a first diameter of the crystallite calculated from a peak present at an angle 2θ of 48 to 49° and a second diameter of the crystallite calculated from a peak present at an angle 2θ of 24 to 26°, by a wide-angle X-ray diffraction method using an X-ray source CuKα ray,
   the first diameter of the crystallite is defined as X and the second diameter of the crystallite is defined as Y, and the first and the second diameters X and Y satisfy formula (1):

$$X/Y \geq 1.27 \tag{1}$$

2. The active material of claim 1, wherein the first and the second diameters X and Y satisfy formula (2):

$$1.27 \leq X/Y \leq 50 \tag{2}$$

3. The active material of claim 1, wherein the first diameter X is 20 nm or more.

4. The active material of claim 1, wherein the first diameter X is 1 μm or less.

5. A non-aqueous electrolyte battery comprising:
   a case;
   a positive electrode housed in the case;
   a negative electrode which is housed in the case, is spatially apart from the positive electrode, and contains an active material containing a monoclinic β-type titanium composite oxide having a crystallite; and
   a non-aqueous electrolyte filled in the case;
   wherein the monoclinic β-type titanium composite oxide has a first diameter of the crystallite calculated from a peak present at an angle 2θ of 48 to 49° and a second diameter of the crystallite calculated from a peak present at an angle 2θ of 24 to 26°, by a wide-angle X-ray diffraction method using an X-ray source CuKα ray,
   the first diameter of the crystallite is defined as X and the second diameter of the crystallite is defined as Y, and the first and the second diameters X and Y satisfy formula (1):

$$X/Y \geq 1.27 \tag{1}$$

6. The battery of claim 5, wherein the first and the second diameters X and Y satisfy formula (2):

$$1.27 \leq X/Y \leq 50 \tag{2}$$

7. The battery of claim 5, wherein the first diameter X is 20 nm or more.

8. The battery of claim 5, wherein the first diameter X is 1 μm or less.

9. The battery of claim 5, wherein the positive electrode comprises lithium nickel composite oxide or lithium manganese composite oxide.

10. A battery pack comprising a plurality of the non-aqueous electrolyte batteries according to claim 5, wherein the batteries are electrically connected in series, parallel or both series and parallel to one another.

* * * * *